Patented Aug. 24, 1954

2,687,432

UNITED STATES PATENT OFFICE 2,687,432

SYNTHESIS OF CARBOXYLIC ACIDS

Donald Drake Coffman, West Chester, Pa., assignor to E. I. du Pont de Nemours and Company, Wilmington, Del., a corporation of Delaware No Drawing. Application October 8, 1952,
Serial No. 313,805

7 Claims. (Cl. 260—532)

This invention relates to carboxylic acids and, more particularly, to a process of synthesizing carboxylic acids.

Carboxylic acids are a well-known and important class of organic compounds highly useful in the preparation of esters, amides, and other derivatives, as well as having a number of other uses. Carboxylic acids having an additional functional group, e. g., dibasic acids, amino acids, carboxynitriles, and hydroxy acids, are useful in the preparation of condensation polymers, the difunctional compounds in which four or more carbons separate the functional groups, generally being the most useful for this purpose. Such polyfunctional compounds also are useful as intermediates or as solvents.

An object of the present invention is to provide a new process of synthesizing carboxylic acids, particularly polyfunctional carboxylic acids. Other objects will be apparent from the description of the invention give hereinafter.

The above objects are accomplished according to the present invention by reacting an organic compound free from open chain, i. e., nonaromatic, carbon-to-carbon unsaturation and containing hydrogen bonded to carbon, with carbon monoxide in the presence of hydroxyl radicals. In a preferred embodiment, the invention comprises reacting an aliphatic compound free from carbon-to-carbon unsaturation, containing at least two carbons and at least two hydrogens on one of the carbons, and containing a negative functional group, in an aqueous medium containing not more than 100 parts, by weight, of water to one part of the aliphatic compound, with carbon monoxide in the presence of hydroxyl radicals, and isolating the carboxylic acid formed.

It has been discovered that carboxylic acids may be readily synthesized by reacting an organic compound as defined above with carbon monoxide in the presence of hydroxyl free radicals. When the organic compound contains a functional group, the resulting carboxylic acid is a polyfunctional compound containing a carboxyl group and whatever functional group or groups the starting organic compound contained. The reaction of this invention is believed to involve hydroxylation of an intermediate acyl radical formed by combination of carbon monoxide with an alkyl or substituted alkyl radical generated by abstraction of a hydrogen atom by a hydroxy radical. Stoichiometrically, the hydroxyl radical should be supplied in a molar ratio of 2:1 as compared to the starting organic compound or the carbon monoxide. To facilitate full utilization of hydroxyl radicals, ratios lower than stoichiometric are usually preferred: generally, ratios within the range of 2:1 to 1:20 will be employed. A test for the presence of hydroxyl radicals is disclosed by Stein and Weiss, Nature 166, 1104–5 (1950).

The presence of hydroxyl radicals, i. e., free hydroxyl radicals or, more expressively, hydroxyl free-radicals, for purposes of the reaction herein involved is conveniently provided by the action of a reducing agent on a peroxide in equivalent amounts. To illustrate, a suitable source of hydroxyl free-radicals is provided through the reaction of an acidic aqueous solution of an inorganic peroxide with a substantially molar equivalent amount of a reducing ion such as the ferrous ion.

The carbon monoxide used in the reaction is introduced in any convenient manner, e. g., by bubbling into the reaction medium or by pressuring the reaction vessel with carbon monoxide and, preferably, should be present in amounts at least equivalent to the quantity of hydroxyl radical employed in the carboxylation of the organic reactant.

The following examples in which all proportions are by weight unless otherwise stated, illustrate specific embodiments of the invention.

*Example I.—Carboxylation of tert.-butyl alcohol to give beta-hydroxyisovaleric acid*

The reactor was a glass flask with indented walls to facilitate stirring. It was fitted with two graduated dropping funnels, a high-speed, glass, propellor-type stirrer, and a sintered glass tube for introduction of gas beneath the surface of the liquid in the reactor. The reactor was charged with a solution consisting of 700 parts tert.-butyl alcohol, 1600 parts water, and 50 parts concentrated sulfuric acid. This solution was chilled to 15° C. to 20° C. by exterior cooling of the reactor with an ice-water bath. One of the dropping funnels was charged with a solution of 278 parts ferrous sulfate heptahydrate and 100 parts concentrated sulfuric acid in 575 parts water, and the other funnel was charged with a solution of 86 parts aqueous 35% hydrogen peroxide and 64 parts water. The contents of the reactor were stirred vigorously and carbon monoxide was bubbled through the solution at the rate of 2 parts per minute. The solution in the funnels were added at such a rate that the funnels were emptied simultaneously in 11 minutes. The temperature of the reaction mixture rose to 25° C.

The reaction products were then isolated by extraction and distillation. To the reaction mixture was added 300 parts of anhydrous sodium sulfate, thereby causing the separation of a phase of which tert.-butyl alcohol was the principal component. The aqueous phase was separated and extracted three times using 2200 parts of methyl ethyl ketone for each extraction. These extracts were combined with the tert.-butyl alcohol solution, and the resulting solution was extracted with a solution of 50 parts sodium hydroxide in 200 parts of water. The aqueous alkaline solution was acidified with 50% sulfuric acid and extracted three times with an equal volume of methyl ethyl ketone. The methyl ethyl ketone extract was dried over anhydrous calcium sulfate and distilled. The product which distilled over at 95–96° C. and 2 mm. pressure was beta-hydroxyisovaleric acid. It was a colorless liquid with a refractive index $n_D^{25}$ 1.4396. It contained 50.52% C, 8.79% H, and had a neutral equivalent of 121.5 as compared with calculated values of 50.8% C, 8.47% H, and neutral equivalent 118 for beta-hydroxyisovaleric acid. The silver salt contained 26.3% C, 3.87% H, and 46.75% Ag, compared with calculated values of 26.6% C, 4.00% H, and 48.0% Ag for silver beta-hydroxyisovalerate. The refractive index, infrared absorption, and pKa were the same as for an authentic sample of beta-hydroxyisovaleric acid prepared by oxidation of di-acetone alcohol. Twenty-one parts of betal-hydroxyisovaleric acid was obtained in the reaction. By evaporation of the tert.-butyl alcohol/methyl ethyl ketone solution from which beta-hydroxyisovaleric acid had been extracted with alkali, a total of 26 parts of 1,1,4,4-tetramethyltetramethylene glycol was obtained.

*Example II.—Carboxylation of pivalonitrile to give beta-cyanoisovaleric acid*

A stainless steel autoclave fitted with a stirrer was charged with 2000 parts water, 83 parts pivalonitrile, and 50 parts concentrated sulfuric acid, chilled to 20° C., and pressured to 200 lb./sq. in. with carbon monoxide. A solution of 278 parts ferrous sulfate heptahydrate and 100 parts concentrated sulfuric acid in 575 parts water and a solution of 86 parts of aqueous 35% hydrogen peroxide in 664 parts of water were pumped into the autoclave at the rate of 46 parts per minute. After these solutions had been added, the pressure on the autoclave was released. The reaction mixture was removed from the autoclave, filtered, and extracted three times with 2200 parts methyl ethyl ketone. The combined methyl ethyl ketone extracts were extracted with a solution of 50 parts sodium hydroxide in 200 parts of water. The aqueous extract was filtered and acidified with sulfuric acid to a pH of 1 and extracted three times with an equal volume of methyl ethyl ketone. The methyl ethyl ketone extracts were dried over calcium sulfate, and the methyl ethyl ketone was distilled at 8 mm. pressure leaving 25 parts of crude beta-cyanoisovaleric acid. This material had a neutral equivalent of 113 as compared to a calculated value of 127 for beta-cyanoisovaleric acid and gave a strong positive test for nitrogen when fused with sodium. A sample of the crude acid was hydrolyzed by heating to 100° C. with concentrated hydrochloric acid. The product, a white crystalline solid had a melting point of 136° C. and a neutral equivalent of 76 compared with a reported melting point of 140° C. and a calculated neutral equivalent of 73 for unsymmetrical dimethylsuccinic acid.

*Example III.—Carboxylation of tert.-butylamine to give beta-aminoisovaleric acid*

The reactor used in Example I was charged with 146 parts tert.-butylamine, 200 parts concentrated sulfuric acid, and 2000 parts water. This solution was chilled to 20° C., and carbon monoxide was bubbled through it at a rate of 2 parts per minute while solutions of ferrous sulfate and hydrogen peroxide were added as in Example I.

Following the addition of these solutions, the reaction mixture was warmed to 50° C. and 1142 parts of barium hydroxide octahydrate was added. The mixture was centrifuged to separate the aqueous solution from the solids which had separated. The liquid was concentrated in vacuo to about one-half the initial volume and more barium hydroxide octahydrate was added until no further precipitation of barium sulfate occurred and the solution was alkaline. The alkaline solution was filtered and concentrated to about one-fourth the initial volume and extracted with n-butyl alcohol to remove unreacted diamine as well as tetramethyltetramethylenediamine, the product of a side-reaction.

Excess barium ion was removed by bubbling carbon dioxide through the reaction mixture and filtering the resulting mixture. The filtrate was evaporated to dryness, giving eight parts of a straw-yellow syrup. The N-dinitrophenyl derivative of this product, prepared by reaction with 2,4-dinitrophenyl fluoride, had the same melting point range as that of the N-dinitrophenyl derivative of an authentic sample of beta-aminoisovaleric acid which acid was prepared by reaction of ammonia with beta, beta-dimethylacrylic acid, and did not depress its melting point. X-ray diffraction patterns of the N-dinitrophenyl derivatives of both amino acids were identical.

It will be understood that the above examples are merely illustrative and that the present invention broadly comprises the process of synthesizing a carboxylic acid by reacting an organic compound free from open chain carbon-to-carbon unsaturation and containing hydrogen bonded to carbon, with carbon monoxide in the presence of hydroxyl radicals, usually in an aqueous reaction medium.

In the process of this invention the functionality of the starting organic compound is increased by the introduction of a carboxyl group in the course of the reaction. This organic reactant must be saturated, i. e., free from open chain carbon-to-carbon nonaromatic unsaturation, and must contain hydrogen bonded to carbon. Preferably, the starting organic compound is aliphatic and, because of greater reactivity, those compounds containing at least 2 carbons and at least 2 hydrogens on one of the carbons, are preferred. The process is particularly useful as applied to those starting organic compounds containing a functional group, especially a negative functional group such as carbonyl, including aldehyde and ketone, carboxyl, including acid and ester, and carbonamido, cyano, amino, and alcoholic hydroxy groups.

The organic compounds adapted for use as the starting material in the process of this invention can be defined as saturated organic compounds represented by the formula:

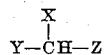

$$Y-\overset{X}{\underset{|}{C}H}-Z$$

wherein X, Y, and Z are hydrogen, hydrocarbon, or functional (negative) groups, and may be alike or different.

Particularly useful organic compounds are monofunctional aliphatic nitriles, amines, and alcohols, especially those containing 2 to 12 carbons, inclusive, and, preferably, 2 to 6 carbons, inclusive. Among such compounds are butylamine, amylamine, laurylamine, butyronitrile, butyric acid, amyl alcohol, cyclohexanol, propionamide, butyraldehyde, butyrolactone, and methyl ethyl ketone.

The starting organic compound is preferably soluble in the reaction medium used, normally an aqueous medium, to an extent of at least 0.1% by weight. It is more practical if the organic compound has a solubility greater than 0.5% and preferably it will have a solubility of at least 3%. To facilitate solution in the reaction medium an inert dispersant or cosolvent can be used.

A requirement for this reaction is the presence of hydroxyl free-radicals. The hydroxyl radical employed in this reaction is suitably provided by generating it from an inorganic peroxide that will yield hydrogen peroxide under acidic conditions, or from hydrogen peroxide itself, and a reducing agent such as an inorganic salt having the metal in the form of an oxidizable ion as, for example, a lower valence state of a metal of series 4 of the Periodic Table and of atomic number 22 to 26, e. g., a substance yielding ferrous, titanous, or vanadous ions. An alternative method for furnishing hydroxyl radicals is by employing radiant energy on hydrogen peroxide in water. A further method is by the use of oxygen with ferrous (+2) or cerous (+3) ions.

To obtain efficient use of the hydroxyl free-radicals, it is desirable that their relative concentration in the reaction mixture be low at any time in view of their high activity and short life. Accordingly, aqueous solutions containing the peroxide and the reducing agent, that is, oxidizable ions, are preferably added gradually and mixed in the reaction mixture in the presence of the organic compound employed. The total amount of hydroxyl free-radical supplied to the reaction mixture may vary between wide limits. Stoichiometrically, the hydroxyl radical should be supplied in molar ratios of 2:1 as compared to the organic starting material or carbon monoxide. However, to effect full utilization of hydroxyl radicals, ratios lower than stoichiometric are preferred and a ratio from 2:1 down to 1:20 will ordinarily be used.

Although it is possible to obtain hydroxyl free-radicals and carry out the reaction of the process of this invention in substantially non-aqueous systems, it is more practical in all but exceptional cases to employ an aqueous reaction medium. The amount of water present in the reaction mixture should not exceed 100 times the weight of the organic compound and generally less than 50 times the weight of the organic compound will be used. When larger amounts of water are present, the concentration of organic compound is relatively low and the yield of carboxylic compound tends to fall off. Preferably, ratios of water to organic compound are less than 9:1 and, particularly, between 1:1 and 5:1, by weight.

The aqueous reaction mixture when such is employed, should be acidic to maintain homogeneity if basic salts are formed which tend to separate and impede the reaction. When ferrous sulfate is employed as the reducing agent, sulfuric acid is suitably employed as the mineral acid. The pH of such a reaction medium accordingly should not exceed 7 and preferably should be less than 2.

The reaction time is not critical but generally at least 10 minutes is required for the addition of the hydroxyl free-radical source, e. g., the generating solution, to the organic compound. Temperatures are dependent upon the particular system used and can vary widely, e. g., from —30° C. to 250° C. When aqueous systems are employed, the preferred temperature range is between —10° C. and 35° C.

The compound formed by the process and containing a new carboxylic group, is isolated by any suitable technique, the selection of which is dependent on the properties of the compound. In general, the isolation involves separation of the product from the water and inorganic materials. Distillation, crystallization, extraction, or precipitation may be employed in the isolation and purification of the carboxylated organic compound. The method of isolation chosen generally is dependent upon the functional group or groups present in the product.

The present invention provides a new and entirely different process of synthesizing carboxylic acids involving reactions of carbon monoxide with hydroxyl free-radicals.

As many apparently widely different embodiments of this invention may be made without departing from the spirit and scope thereof, it is to be understood that the invention is not limited to the specific embodiments thereof except as defined in the appended claims.

The invention claimed is:

1. Process of synthesizing a carboxylic acid which comprises reacting an organic compound free from open chain carbon-to-carbon unsaturation and containing hydrogen bonded to carbon, with carbon monoxide in the presence of hydroxyl free-radicals in an aqueous medium containing not more than 100 parts, by weight, of water to one part of said organic compound.

2. Process as set forth in claim 1 wherein said organic compound is an aliphatic compound containing at least two carbons and at least two hydrogens on one of the carbons and containing a negative functional group.

3. Process as set forth in claim 2 wherein said reaction is carried out in an aqueous medium containing not more than 9 parts, by weight, of water to one part of said organic compound.

4. Process of synthesizing beta-hydroxyisovaleric acid which comprises reacting tert.-butyl alcohol in aqueous medium containing not more than 9 parts, by weight, of water to one part of tert.-butyl alcohol, with carbon monoxide in the presence of hydroxy free-radicals.

5. Process as set forth in claim 4 wherein said hydroxy free-radicals are provided by the reaction of an acidic aqueous solution of hydrogen peroxide with a substantially molar equivalent amount of ferrous sulfate.

6. Process of synthesizing a carboxylic acid which comprises reacting an organic compound free from open chain carbon-to-carbon unsaturation and containing hydrogen bonded to carbon, with carbon monoxide in the presence of hydroxyl free-radicals in an aqueous medium containing not more than 100 parts, by weight, of water to one part of said organic compound, said hydroxyl free-radicals being provided by the reaction of an inorganic peroxide with an inorganic salt having its metal in the form of an oxidizable ion.

7. Process of synthesizing a carboxylic acid which comprises reacting an organic compound free from open chain carbon-to-carbon unsaturation and containing hydrogen bonded to carbon, with carbon monoxide in the presence of hydroxyl free-radicals in an aqueous medium containing not more than 100 parts, by weight, of water to one part of said organic compound, said hydroxyl free-radicals being provided by the reaction of hydrogen peroxide with ferrous sulfate.

No references cited.